(12) United States Patent
Tang

(10) Patent No.: US 10,324,956 B1
(45) Date of Patent: Jun. 18, 2019

(54) AUTOMATICALLY MAPPING ORGANIZATIONS TO ADDRESSES

(71) Applicant: Microsoft Technology Licensing, LLC, Redmond, WA (US)

(72) Inventor: Grace W. Tang, Los Altos, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 611 days.

(21) Appl. No.: 14/937,974

(22) Filed: Nov. 11, 2015

(51) Int. Cl.
*G06F 16/23* (2019.01)
*H04L 29/06* (2006.01)
*G06F 16/28* (2019.01)
*H04L 29/12* (2006.01)

(52) U.S. Cl.
CPC ........ *G06F 16/285* (2019.01); *G06F 16/2322* (2019.01); *H04L 61/10* (2013.01); *H04L 63/1441* (2013.01)

(58) Field of Classification Search
USPC ........................................................ 707/737
See application file for complete search history.

(56) References Cited

U.S. PATENT DOCUMENTS

| | | | |
|---|---|---|---|
| 8,316,440 B1 | 11/2012 | Hsieh | |
| 8,825,785 B1* | 9/2014 | Shah | G06Q 10/107 709/206 |
| 8,832,832 B1 | 9/2014 | Visbal | |
| 8,909,559 B1* | 12/2014 | Shah | G06Q 10/107 705/319 |
| 8,935,750 B2* | 1/2015 | Golovanov | G06F 21/56 380/30 |
| 2004/0006708 A1* | 1/2004 | Mukherjee | H04L 12/4679 726/15 |
| 2004/0010447 A1* | 1/2004 | Asayama | G06Q 30/02 705/14.35 |

(Continued)

OTHER PUBLICATIONS

Xiao et al., Detecting Clusters of Fake Accounts in Online Social Networks, AISec'15, Oct. 16, 2015, Denver, Colorado, USA, pp. 91-101. (Year: 2015).*

(Continued)

*Primary Examiner* — Cheyne D Ly
(74) *Attorney, Agent, or Firm* — Hickman Palermo Becker Bingham LLP

(57) ABSTRACT

Techniques are provided for automatically detecting organizational affiliation of host addresses based on analysis of records. In an embodiment, computers store membership records and access records. Each membership record has an organization identifier that identifies an organization and a member identifier that identifies a member. Each access record has a member identifier that identifies a member and an address that identifies a host. The computers identify a localized subset of access records that have a particular address. The computers identify an involved subset of membership records having a member identifier that matches a member identifier of an access record of the localized subset. The computers determine statistical information based on the localized subset of access records and the involved subset of membership records. Based on the statistical information, the computers identify an organization identifier whose frequency within organization identifiers of the membership records of the involved subset exceeds a threshold.

19 Claims, 6 Drawing Sheets

(56) References Cited

U.S. PATENT DOCUMENTS

| | | | |
|---|---|---|---|
| 2004/0074169 A1 | 4/2004 | Renke et al. | |
| 2004/0143469 A1* | 7/2004 | Lutz | G06Q 10/10 |
| | | | 705/321 |
| 2005/0015624 A1 | 1/2005 | Ginter | |
| 2005/0055450 A1* | 3/2005 | Gang | G06F 17/30867 |
| | | | 709/228 |
| 2007/0074169 A1 | 3/2007 | Chess | |
| 2007/0276858 A1* | 11/2007 | Cushman, II | G06F 17/30303 |
| 2007/0294296 A1* | 12/2007 | Silver | G06Q 30/02 |
| 2008/0005106 A1* | 1/2008 | Schumacher | G06F 17/30489 |
| 2011/0060905 A1* | 3/2011 | Stack | G06Q 10/10 |
| | | | 713/167 |
| 2011/0296003 A1 | 12/2011 | McCann | |
| 2014/0172989 A1 | 6/2014 | Rubinstein | |
| 2014/0222702 A1* | 8/2014 | Jennings | G06Q 30/0631 |
| | | | 705/319 |
| 2015/0215325 A1 | 7/2015 | Ogawa | |
| 2015/0220646 A1* | 8/2015 | Goldenberg | G06Q 50/01 |
| | | | 707/748 |
| 2015/0339477 A1 | 11/2015 | Abrams | |
| 2015/0350229 A1 | 12/2015 | Mitchell | |
| 2015/0350350 A1* | 12/2015 | Vijay | H04L 67/18 |
| | | | 709/204 |
| 2016/0021136 A1 | 1/2016 | McGloin | |
| 2016/0127402 A1 | 5/2016 | Veeramachaneni | |
| 2016/0164903 A1 | 6/2016 | Murynets | |

OTHER PUBLICATIONS

Bray, U.S. Appl. No. 14/819,808, filed Aug. 6, 2015, Office Action dated Sep. 8, 2017.
Bray, U.S. Appl. No. 14/819,808, filed Aug. 6, 2015, Final Office Action dated Apr. 17, 2018.

* cited by examiner

EXAMPLE DISTRIBUTIONS OF ORGANIZATION AFFILIATION AMONGST
MEMBERS AT A PARTICULAR HOST ADDRESS

CHART A

CHART B

AUTOMATICALLY MAPPING ORGANIZATIONS TO ADDRESSES

FIELD OF THE DISCLOSURE

The present disclosure relates to detecting organizational affiliation of host addresses based on analysis of records of user access and user membership.

BACKGROUND

A fake association with a reputable company can enhance the credibility and effectiveness of a malicious social engineering campaign, such as phishing, typosquatting, brandjacking, professional recruiting fraud, and financial fraud. An online social network may be a fruitful environment for such fraud. Self-reporting of user identity and affiliations further enable fraud.

Third party whitelists and blacklists may help to some extent. However, automatic detection of a user who is involved with a malicious campaign is a topic of ongoing research.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for automatically determining organizational affiliation of host addresses based on analysis of records of user membership and user access. In an embodiment, one or more computers store access records and membership records. Each membership record has an organization identifier that identifies an organization and a member identifier that identifies a member. Each access record has a member identifier that identifies a member and an address that identifies a host.

In operation, the computers identify a localized subset of access records that have a particular address. The computers also identify an involved subset of membership records whose member identifier matches a member identifier of an access record of the localized subset.

The computers determine statistical information such as entropies, quantities, and percentages based on the localized subset of access records and the involved subset of membership records. Based on the statistical information, the computers identify an organization identifier whose frequency within organization identifiers of the membership records of the involved subset exceeds a threshold.

In embodiments, the computers determine an organizational affiliation of an IPv4 or IPv6 address based on website page views. The computers apply various thresholds to increase accuracy by suppressing noise.

In embodiments, the computers categorize a host address based on organizational entropy and other statistical information. Categories include commercial, public, and private.

Example Computer System

Figure 1:
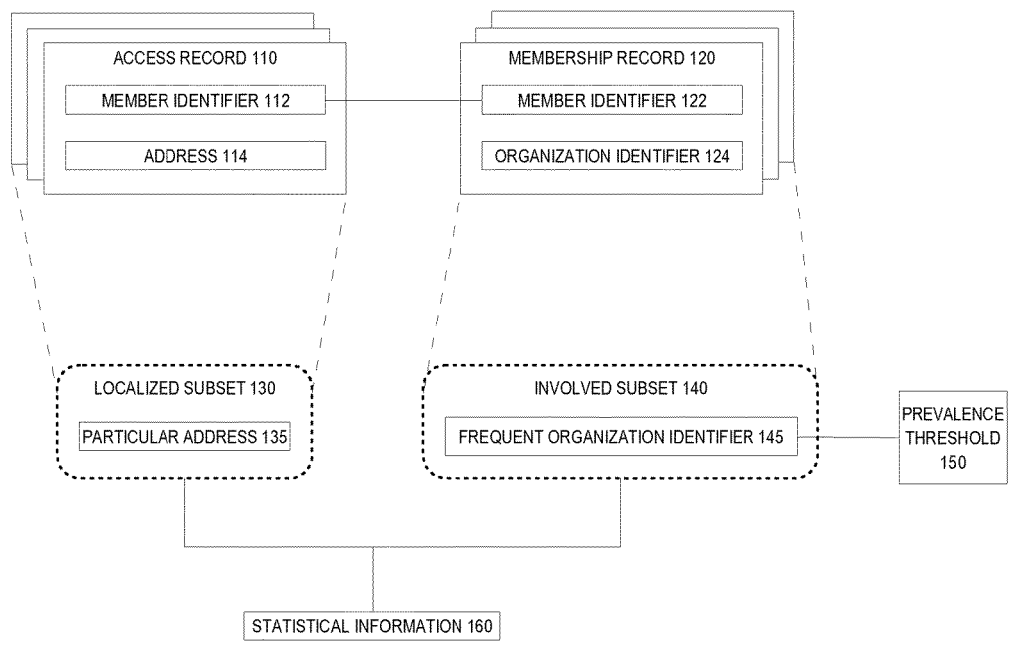
FIG. 1 is a block diagram that depicts an example computer system that automatically determines an organizational affiliation of a host address, in an embodiment.

FIG. 1 is a block diagram that depicts example computer system 100 for automatically mapping organizations to addresses, in an embodiment. Computer system 100 may have one or more rack servers such as a blade, personal computers, or any computer capable of processing records.

Computer 100 stores access records 110 and membership records 120, which may be database records, spreadsheet entries, file entries, or another durable data structure that has fields. Records 110 and/or 120 may be managed by middleware that provides searching, indexing, and joining. For example, computer system 100 may achieve big data support by storing records 110 and/or 120 in a Hive data warehouse backed by a Hadoop distributed file system (HDFS).

Each access record 110 documents a historical access event for an online resource by a member. The online resource may be a website, a remote service, or other connected facility that members may access over a computer network, such as the global Internet. An access event may be a login, a webpage view, a service invocation, a file access, or other online interaction between the member and the online resource.

A user may be a human of any intent, a more or less disinterested robotic web crawler, a hand-crafted malicious script, or other network client computer program. An implementation of computer system 100 may exclude or otherwise specially process requests from a user based on an automatic characterization of the user. For example, computer system 100 may recognize and avoid processing or counting interactions of a user that is a known harmless robotic web crawler.

A member is an identified user that is known to computer system 100 by a member identifier that is unique. A member identifier, such as member identifiers 112 or 122, may be an email address, a serial number, a login name, or other natural or synthetic datum that uniquely identifies each user.

The online resource may authenticate or otherwise determine an identity of a member by requiring that the member log in or by receiving, from a client device used by the member, an identifying attribute such as a previously-placed hypertext transfer protocol (HTTP) cookie, a smartphone telephone number, a digital signature such as an extensible markup language (XML) signature, or a device fingerprint such as a canvas fingerprint or other browser fingerprint.

A browser fingerprint may be partly based on HTTP headers such as user agent and HTTP accept. A browser fingerprint may be partly based on attributes harvested by JavaScript such as screen resolution, time zone, installed plugins, multi-purpose internet mail extensions (MIME) types, and system fonts.

Each access record 110 contains a member identifier 112 and an address 114 that more or less identifies the origin of an access request. Address 114 may be an IP address, a media access control (MAC) address, a geocode, a device fingerprint, a browser fingerprint, a postal address, a telephone number, or other identifier that more or less enables identification of client devices or client points of presence.

The member identifier 112 of each access record 110 matches the membership identifier 122 of a membership record 120. For example, access records 110 may be rows in a relational table of accesses, and membership records 120 may be rows in a relational table of members. As such, an access record 110 may be joined with a membership record 120, perhaps by a structured query language (SQL) join clause.

A membership record 120 may typically be created before creating any associated access records 110. A membership record 120 may be created during an interactive registration phase or perhaps automatically under other circumstances.

With the online resource, a member may have multiple access interactions such as different or repeated webpage views. As such, a membership record 120 may be associated with multiple access records 110. Over time, multiple members may access the online resource from a same address 114. Thus, access records 110 having a same address 114 may have different member identifiers 112.

Each membership record 120 contains a member identifier 122 and an organization identifier 124 that identifies an organization with which the member is supposedly affiliated. An organization may be a company, a charity, a school, a government agency, or other organization or institution.

Organization identifier 124 may be an email address, an internet domain name, a uniform resource locator (URL), a serial number, an organization name, or other natural or synthetic datum that uniquely identifies each organization. An organization identifier 124 of a membership record 120 may be missing, blank, or null if a corresponding member is not affiliated with an organization or has not declared an affiliated organization.

In an embodiment, a member with a particular member identifier 122 may be affiliated with multiple organizations. Multiple membership records 120 may share a member identifier 122 and have different organization identifiers 124. For example, an experienced employment candidate with many previous employers may be affiliated with multiple companies. In another example, a board member simultaneously serves on the boards of several companies.

Affiliation between a member and an organization may be self-reported, automatically harvested from an incompletely scrubbed data source, or otherwise captured in an error prone way. As such, organization identifier 124 of a membership record 120 may be accidentally or maliciously inaccurate.

Self-reported data is inherently unreliable due to potential benefits to a member for falsely declaring an affiliation. For example, a malicious social engineer may pose online as a human resource contact or a bank employee. Automatic analysis by computer system 100 may uncover such fraud.

In operation, computer system 100 processes records 110 and 120 to associate addresses with organizations. For each unique address 114, such as particular address 135, computer system 100 selects localized subset 130 of access records 110. Localized subset 130 contains those access records 110 whose address 114 matches particular address 135. As such, localized subset 130 may encompass most or all of the activity of various members who connect to the online resource from a particular location.

Involved subset 140 encompasses those various members who connected from particular address 135. For example, computer system 100 may use member identifiers 112 and 122 to join localized subset 130 of access records 110 with membership records 120 to select involved subset 140 of membership records 120.

Computer system 100 attempts to determine by which organization is particular address 135 owned, operated, or otherwise associated. In an idealized trivial case, all of the members of involved subset 140 have a same organization identifier 124 and so are affiliated with a same organization. In which case, computer system 100 may conclude that that organization is associated with particular address 135.

However, real data may be noisy. For example, a person may visit a company, even though the person is affiliated with a different organization. A laptop computer or smartphone of the person may be temporarily assigned a host address by a local network of the company.

For example, a corporate wireless fidelity (Wi-Fi) network may use dynamic host configuration protocol (DHCP) to lease an IP address to a visiting laptop. If the person is a member with the online resource, then through the leased IP address, the member may access the online resource and cause some access records 110 to be created.

As such, the membership records 120 of involved subset 140 may have a mix of different organization identifiers 124. However, statistically, on computer networks of many organizations, such as a corporate local area network (LAN), access of the online resource by affiliates of the organization will tend to predominate over access by visitors.

As such, one organization identifier 124 may be the most frequently occurring organization identifier 124 among the membership records 120 of involved subset 140. Computer system 100 may detect this most frequently occurring organization identifier 124 of involved subset 140 and designate it as frequent organization identifier 145. Computer system 100 may determine that frequent organization identifier 145 identifies which organization should actually be associated with particular address 135.

However, many factors may cause an inaccurate association of frequent organization identifier 145 with particular address 135. Particular address 135 may be open to the public, such as in a library or internet café.

For example, librarians may actually be affiliated with a library as employees. Whereas, library patrons are not employees of the library and so are not actually affiliated with the library. Particular address 135 may be reused across library patrons and employees alike, thereby introducing noise into the organization identifiers 124 of membership records 120 of involved subset 140.

Likewise, housemates of a household may reuse a particular address 135 that is owned and operated by an internet service provider (ISP). The housemates are not employees of the ISP and so may cause noise within the records of involved subset 140.

The presence of noise within the organization identifiers 124 of membership records 120 of involved subset 140 may cause computer system 100 to falsely associate particular address 135 with an incorrect organization. To prevent such a false association, computer system 100 may associate particular address with no organization if frequent organization identifier 145 does not occur with sufficient frequency or proportion amongst the membership records 120 of involved subset 140.

To ensure sufficient frequency, computer system 100 may compare the frequency of frequent organization identifier 145 with prevalence threshold 150. Prevalence threshold 150 may be a count, a percent, or other statistical criterion.

Experimentation revealed that 50-60% is effective for prevalence threshold 150. For example, if frequent organization identifier 145 occurs in less than 50% of the membership records 120 of involved subset 140, then computer system 100 may decide not to associate frequent organization identifier 145 with particular address 135.

In an embodiment, prevalence threshold 150 may be set below 50%. This is to account for imperfect company affiliations, especially with company acquisitions and company subsidiaries. For example, members working for Bank of America and members working for Merrill Lynch may be affiliated with each other and may share an office and an IP address. Given some fraction of visitors may also use the IP address, it is possible that neither the Bank of America members nor the Merrill Lynch members amount to at least 50% of the members at the IP address.

An advantage of setting prevalence threshold 150 above 50% is that inherently prevents multiple organization identifiers 124 from occurring at a same frequency and jointly qualifying as frequent organization identifier 145. For example, a frequency threshold of 51% prevents a three-way tie for frequent organization identifier 145 between three organization identifiers 124 that each occurred within involved subset 140 with a frequency of 33% and also prevents a two-way tie between two organization identifiers 124 that each occurred at 50%.

Computer system 100 may falsely determine that particular address 135 is associated with frequent organization identifier 145. For example, the size of involved subset 140 may be too small to ensure statistical accuracy. As such, an embodiment may decide not to associate particular address 135 with frequent organization identifier 145 if the size of involved subset 140 falls below a threshold.

Additionally, the size of an organization may be too small to merit correlation with particular address 135. For example, an organization in which only one person has a membership record 120 would not be correlated to particular address 135.

Computer system 100 processes subsets 130 and 140 to derive statistical information 160. Statistical information 160 has data that computer system 100 may use to directly determine whether to associate frequent organization identifier 145 with particular address 135.

Statistical information 160 may have a histogram, an entropy measurement, or other derived details or abstractions that reflect on the likelihood that frequent organization identifier 145 and particular address 135 are associated in a way that reflects a fundamental underlying relationship, such as ownership or administration. In some cases, such as a public bus or an independent apartment complex that offers Wi-Fi and at which employees of one company predominate, it may be appropriate for computer system 100 to find such a fundamental underlying relationship between organization identifier 145 and particular address 135 even though ownership and control are absent.

Computer system 100 processes statistical information 160 to associate frequent organization identifier 145 with particular address 135. Computer system 100 or its owner may subsequently use this organizational association in a variety of ways.

For example, computer system 100 may record the association of frequent organization identifier 145 with particular address 135. Such derived knowledge may be contributed to a third party database or otherwise shared with interested third parties.

The determined organizational affiliation of particular address 135 may be used to scrub or otherwise validate the organization identifiers 124 of membership records 120. The determined organizational affiliation of particular address 135 may be used for security purposes to decide which members are allowed access to the online resource or from which addresses members may have access.

The determined organizational affiliation of particular address 135 may be used to detect a fraudulently self-reported organizational affiliation of a member. For example, computer system 100 may detect that a devious member purports to be an employee of a bank, but never accesses the online resource from a network address that is associated with the bank.

Example Organization Determination Process

Figure 2:
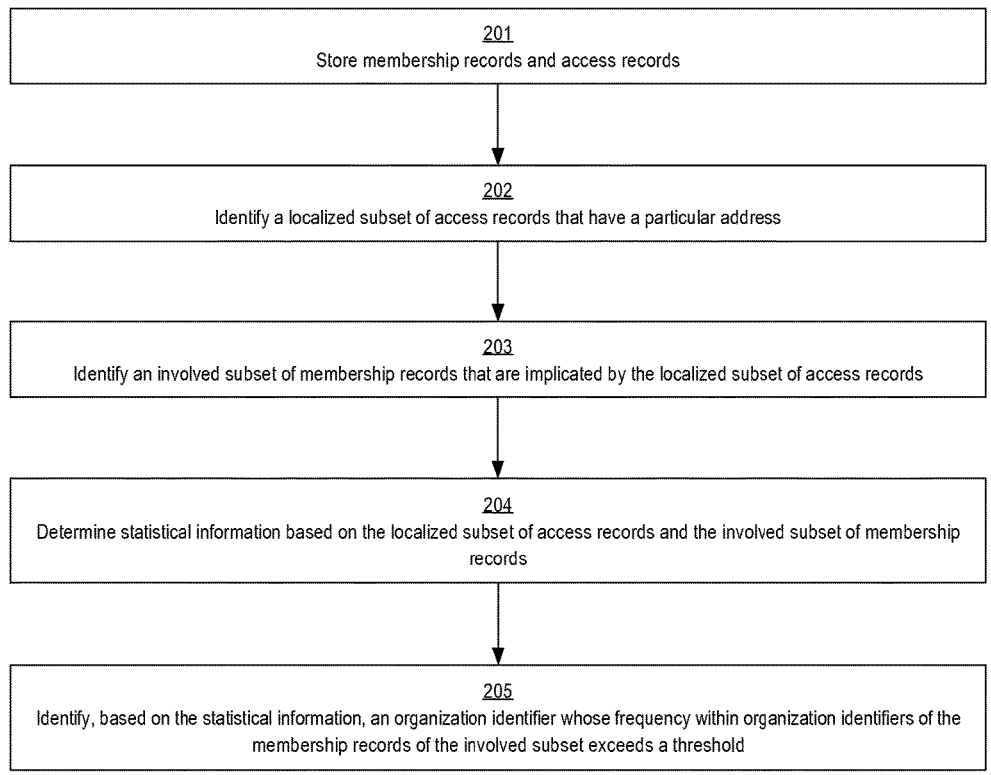
FIG. 2 is a flow diagram that depicts an example process for automatically determining an organizational affiliation of a host address, in an embodiment.

FIG. 2 is a flowchart that depicts an example process for automatically mapping organizations to addresses that may be performed by computer system 100 or other embodiments.

Step 201 is preparatory and involves storing membership records and access records for later retrieval. For example, computer system 100 may be part of the infrastructure of a popular website that requires user registration. User registration may include self-declaration of affiliation to a third-party organization. Likewise, a member may make such a self-declaration sometime after registration. Computer system 100 may save the details, either of a user registration or a subsequent change to a user profile, within a membership record 120.

The fields of records 110 and 120 may originate at different subsystems. A transport control protocol (TCP) stack may provide address 114. A web application or web server may provide member identifier 112. Access records 110 may be stored in a different database system or file system than are membership records 120. However, collocation of both record types may facilitate subsequent processing.

Computer system 100 may maintain membership records 120 and/or access records 110 within a data warehouse. The data warehouse may ingest access data from server logs, transactional databases, or other online sources to create access records 110. The interactions of web crawlers and other known disinterested and harmless robots may be excluded from the data warehouse.

Steps 202-205 may be repeated for each unique address 114 that occurs within access records 110. In step 202, historical access that originates from a given address is identified, perhaps from multiple members. For example, computer system 100 may select localized subset 130 from access records 110 having an address 114 that matches particular address 135. If address 114 is an IPv6 address, then a match may occur when at least the subnets of address 114 and particular address 135 match. Such selection may occur according to a database query, a pig script, or other filtration mechanism.

In step 203, members that caused the accesses encompassed by the localized subset are identified. For example, computer system 100 may use member identifiers 112 and 122 to join localized subset 130 of access records 110 with membership records 120 to select involved subset 140 of membership records 120. Such a join may be readily implemented by an SQL query, a hive query language (HQL) query, or a pig script.

The computational expense of a join grows quadratically, in both space and time, in proportion to the amount of records. As such, a cluster computing paradigm such as bulk synchronous parallel (BSP), and especially MapReduce, may achieve sufficient horizontal scale needed to tame such complexity.

In step 204, statistical information is derived based on the localized subset of access records and the involved subset of membership records. For example, statistical information 160 has data that computer system 100 may use to directly determine whether to associate frequent organization identifier 145 with particular address 135. Statistical information 160 may have a histogram, an entropy measurement, or other derived details or abstractions that reflect on the likelihood that frequent organization identifier 145 and particular address 135 are associated in a way that reflects a fundamental underlying relationship, such as ownership or administration.

In step 205 and based on the statistical information, an organization is identified as an owner of, or otherwise significantly associated with, a host address. For example, computer system 100 processes statistical information 160 to determine that frequent organization identifier 145 and particular address 135 are sufficiently related to deduce an association between them. Computer system 100 may use prevalence threshold 150 to ensure that frequent organization identifier 145 is statistically relevant. In most cases, exceeding the threshold indicates statistical relevance. However when entropy is compared to prevalence threshold 150, statistical relevance occurs when the entropy falls below the threshold.

A determination by computer system 100 of an organizational affiliation for particular address 135 may be actionable. Computer system 100 may record this result or share it with interested third parties. The determined organizational affiliation of particular address 135 may be subsequently used for access control or fraud investigation.

Computer system 100 may store statistical information 160 in additional records. Data mining may enable computer system 100 to detect sudden departures from historical trends in statistical information 160. Such a trend departure may trigger manual or automatic auditing and perhaps lead to recalibration of the heuristics and statistics applied by computer system 100. For example, an organizational affiliation between an old organization and predominantly new members may cause a trend departure away from historic patterns of the membership records 120 of the organization, may signal fraud, and may be cause for manual or automatic security intervention.

Determining Organization Based on Website Page Views from IP Addresses

Figure 3:
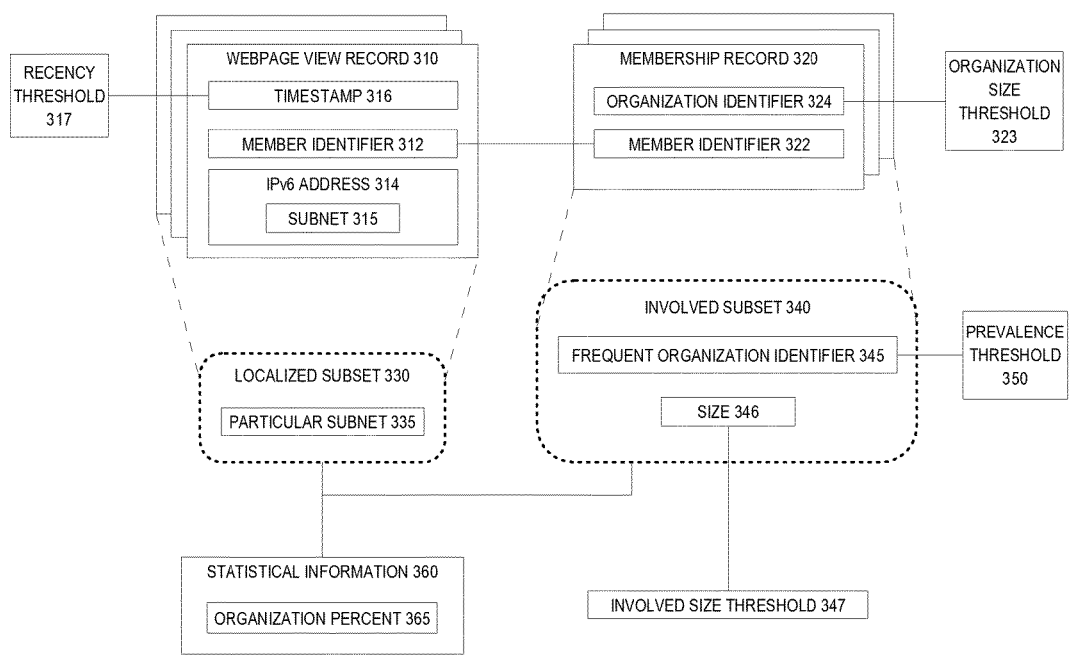
FIG. 3 is a block diagram that depicts an example computer system that automatically determines an organizational affiliation of a host address, in an embodiment.

FIG. 3 is a block diagram that depicts example computer system 300 for automatically mapping organizations to IP version 6 (IPv6) and IPv4 addresses, in an embodiment. Computer system 300 may be an implementation of computer system 100. Computer system 300 determines an organizational affiliation of an IPv6 or IPv4 address based on website page views. Computer system 300 applies various thresholds to increase accuracy by suppressing noise.

Computer system 300 operates on data records 310 and 320 that are based on transactional information of an associated website. In an embodiment, data records 310 and 320 reside in a data repository that is shared by computer system 300 and the website. For example, the website may create records 310 and 320 on an ongoing basis during ordinary operation of the website. Computer system 300 may directly retrieve and process those records. However, doing so may impose an unacceptable processing load on the data repository or cause interference problems, such as lock contention.

In another embodiment, computer system 300 maintains records 310 and 320 in its own data repository. Computer system 300 may populate its data repository by copying or otherwise importing records from a website transactional database. Alternatively, computer system 300 may ingest interaction data from server logs, website database data dumps, or other online sources, perhaps according to a regular schedule such as a nightly batch process.

In any case, computer system 300 has access to webpage view records 310 and membership records 320, perhaps in a data warehouse. Each membership record 320 contains an organization identifier 324 and a member identifier 322. Member identifier 322 identifies a particular user having an established membership with the associated website. Member identifier 322 may be a login name, a telephone number, an email address, a serial number, or other unique identifier.

Organization identifier 324 identifies an organization, such as a company, that the member is affiliated with. Organizational affiliation may be self-reported or automatically harvested from online data sources of various accuracies. Organization identifier 324 may be an organization name, a serial number, or other unique identifier.

In an embodiment, organization identifier 324 is null or blank if the member of membership record 320 is unaffiliated or has not declared an affiliation with an organization. In an embodiment, a member may be affiliated with multiple organizations. For example, multiple membership records 320 may share a member identifier 322 and have different organization identifiers 324.

Discrete page views of the website by members are recorded individually as webpage view records 310. Webpage view records 310 contains timestamp 316, IPv6 address 314, and member identifier 312. Member identifier 312 is similar to member identifier 322 and may be used as a foreign key for joining instances of records 310 and 320. Timestamp 316 may be a datum such as a Gregorian date or an integer Epoch time.

IPv6 address 314 may contain a raw IP address. Depending on the configuration of an access point of a client device of a member, the raw IP address may be a 128-bit IPv6 address or a 32-bit IP version 4 (IPv4) address.

However, a full IPv6 address may be too finely grained for modeling user isolation. For example, a user with multiple residential devices may interact with an online entity from several similar IPv6 addresses originating from within a household and each address assigned to a different collocated device. As such and although IPv6 address 314 may record an entire IPv6 address, computer system 300 may instead truncate, during storage or retrieval, an IPv6 address so as to include a subnet prefix, but not an entire IPv6 address. The subnet prefix is shown as subnet 315.

In operation when determining which webpage view records 310 belong in localized subset 330, computer system 300 may select webpage view records 310 based on matching particular subnet 335 and subnet 315. A full IPv6 address 314 need not be compared. Subnet 315 should be sufficient to identify a member or handful of related members because, for example, a residential ISP typically dedicates a whole IPv6 subnet to each household.

Computer system 300 applies various data thresholds to suppress noise by ignoring records of limited relevance. For example, values of some identifiers or other fields may occur too infrequently to give reliable statistics. These data thresholds include involved size threshold 347, prevalence threshold 350, organization size threshold 323, and recency threshold 317.

If computer system 300 is properly calibrated, it can determine an organizational affiliation of an IPv6 address 314 based on a limited duration of access history. Inclusion of successively older history produces diminishing returns for determining an organizational affiliation. Furthermore, time and space demand by computer system 300 may become intractable as more access history is considered. Likewise, assignment of an IP address or range may be transferred to an unrelated organization, as when a corporation is liquidated. History prior to the liquidation may be misleading as to the current affiliation of the IP address.

As such, computer system 300 may apply recency threshold 317 to filter away stale webpage view records 310 that do not reflect current usage. For example, recency threshold 317 may limit processing to webpage view records 310 of a recent few months. In another embodiment, enforcement of a retention policy may automatically purge webpage view records 310 of excessive age, perhaps obviating a need for recency threshold 317.

If few members are affiliated with an organization, especially a small organization, a population size may be too small to derive meaningful statistics. As a trivial example, if only one member is supposedly affiliated with an organization, then corroboration of data might be difficult or impossible. Statistical confidence of organizational affiliation may depend on corroboration of overlapping data of multiple members. Computer system 300 may use various thresholds to ensure that resource intensive analytics are only expended on data clusters of ample size.

Involved subset 340 encompasses various members who connected from particular subnet 335. For example, computer system 300 may use member identifiers 312 and 322 to join localized subset 330 of webpage view records 310 with membership records 320 to select involved subset 340 of membership records 320.

An involved subset 340 of too few membership records 320 might be too small to be statistically meaningful. As such, computer system 300 may avoid analysis of particular subnet 335 if the size of involved subset 340, shown as size 346, does not exceed involved size threshold 347. For example, if size 346 is not at least 100, then computer system 300 may leave an organizational affiliation of particular subnet 335 as undetermined.

When involved size threshold 347 is satisfied, computer system 300 determines frequent organization identifier 345 and applies additional thresholds. Frequent organization identifier 345 indicates the most frequently occurring organization identifier 324 among the membership records 320 of involved subset 340.

A noisy particular subnet 335, such as a subnet that is open to the public at a library or internet café, may have an involved subset 340 composed of organizationally diverse members. As such, involved subset 340 may have membership records 320 having a wide variety of organization identifiers 324, each occurring at a low frequency and no specific organization identifier 324 clearly predominating.

Under such conditions entropy is high, and frequent organization identifier 345 may occur only slightly and insignificantly more frequently than other organization identifiers 324. Computer system 300 may avoid further analysis of such a particular subnet 335 when the frequency of frequent organization identifier 345 within involved subset 340 does not exceed prevalence threshold 350. Prevalence threshold 350 may be a percentage, an absolute amount, or an entropy amount. However in the case of entropy, a larger entropy is noisier. Hence, the direction of prevalence threshold 350 is reversed when comparing to entropy. As such, further analysis is avoided if entropy exceeds prevalence threshold 350.

Entropy may be measured according to various information theory formulas, such as with Shannon entropy and string distance. Column entropy has the simplest entropy formula and is readily expressed in SQL. For example, involved subset 340 may be selected into a temporary table named "InvolvedSubset", in which organization identifier 324 is represented in a column named "Organization". As such, this simple query measures the column entropy of organization identifiers 324 within involved subset 340:

SELECT LOG2(COUNT(DISTINCT Organization))
   FROM InvolvedSubset

An entropy measurement may be normalized along a scale from 0 to 1. For example, complete diversity may have a maximum entropy amount of 1. Whereas, complete homogeneity may have a minimum entropy amount of 0. As such within involved subset 340, sufficient entropy of organization identifiers 324 would be an entropy value that falls below, not above, prevalence threshold 350 because less entropy means higher confidence.

This query measures the Shannon entropy of organization identifiers 324 within involved subset 340:

SELECT-SUM(n_at_organization/n_total*LOG(n_at_organization/n_total))/SUM(1/n_organizations*LOG(n_organizations))
FROM (SELECT COUNT(*) AS n_at_organization FROM InvolvedSubset GROUP BY Organization) A
JOIN (SELECT COUNT(*) AS n_total FROM InvolvedSubset) B
JOIN (SELECT COUNT(DISTINCT Organization) AS n_organizations FROM InvolvedSubset) C The above query calculates normalized entropy according to the standard Shannon entropy formula. Normalization accounts for larger companies having higher entropy simply because they have more employees that may have moved to other jobs or be working multiple jobs and thus be affiliated with multiple companies. However, there may be problems with this normalization. For example, normalize by the size of the organization may be better.

Frequent organization identifier 345 identifies an organization with a highest likelihood of ownership or control of particular subnet 335. However, statistical confidence may still be lacking if, regardless of subnet 315, too few members are affiliated with that organization. As such, computer system 300 may refrain from determining an organizational affiliation of a particular subnet 335 when the count of those organization identifiers 324 that match frequent organization identifier 345 does not exceed organization size threshold 323.

Computer system 300 generates statistical information 360 from localized subset 330 and involved subset 340. Computer system 300 then processes statistical information 360 to decide whether an association between frequent organization identifier 345 and particular subnet 335 has sufficient corroboration to conclude that an ownership, control, or other significant relationship exists.

Statistical information 360 may include organization percent 365, which is a percentage of membership records 320 within involved subset 340 that have an organization identifier 324 that matches frequent organization identifier 345. As such, organization percent 365 is a percentage of involved subset 340 that are affiliated with the predominant organization of involved subset 340.

Only when organization percent 365 exceeds a threshold will computer system 300 determine that particular subnet 335 is actually associated with frequent organization identifier 345. Depending on an embodiment, this threshold may actually be prevalence threshold 350, or these may be different thresholds that apply to different measurements. For example, prevalence threshold 350 may be an absolute amount and not a percentage.

Organizational Entropy

Figure 4:
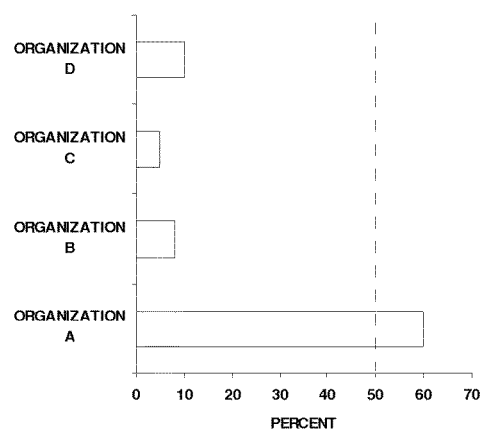
FIG. 4 depicts bar charts of histograms of data distributions, in an embodiment.
Figure 4:
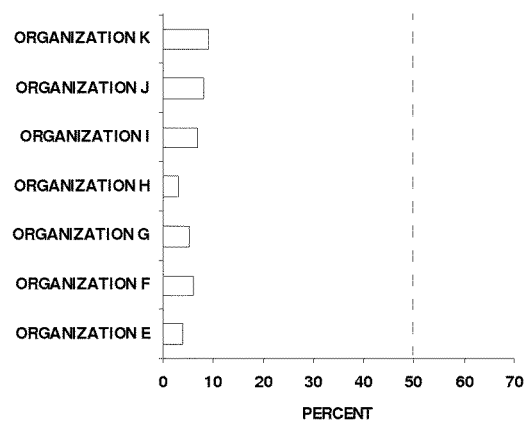

FIG. 4 depicts example bar charts A and B that respectively illustrate low and high entropy of organizational affiliation for a given host address. Discussion of charts A and B regard FIG. 4. However, charts A and B are also applicable to FIG. 5. Charts A and B present data that occurs within an involved subset of membership records, such as involved subset 340.

The vertical axis of each chart is the independent axis which lists organizations whose identifiers occur within the involved subset being analyzed. The horizontal axis is the dependent axis which measures frequencies at which the listed organizations occur within the involved subset. As such, each bar of the bar charts represents a histogram bucket.

Shown as a dashed vertical line in charts A and B, prevalence threshold 350 is 50%. As such, an organization identifier cannot qualify as frequent organization identifier 345 unless the organization identifier exceeds 50%.

In chart A, the frequency value for organization A is 60%, which exceeds prevalence threshold 350. As such, frequent organization identifier 345 is the identifier of organization A, and organization percent 365 is 60%.

As shown, the length of the bar of organization A far exceeds that of the other organizations. As such, involved subset 340 has a low entropy of organization identifiers 324. Because entropy and confidence are inversely correlated, computer system 300 may have a high confidence that particular subnet 335 is associated with organization A. This may be the case when particular subnet 335 corresponds to a corporate LAN that is owned and privately operated by organization A.

The character of chart B differs from that of chart A. For chart B, the members in involved subset 340 are widely and fairly evenly distributed amongst many organizations. As such entropy is high, and no organization exceeds prevalence threshold 350. This may be the case when particular subnet 335 corresponds to a public LAN, perhaps in a library or internet café. Because prevalence threshold 350 is not exceeded or entropy is high, computer system 300 does not associate particular subnet 335 with any organization.

Address Categorization

Figure 5:
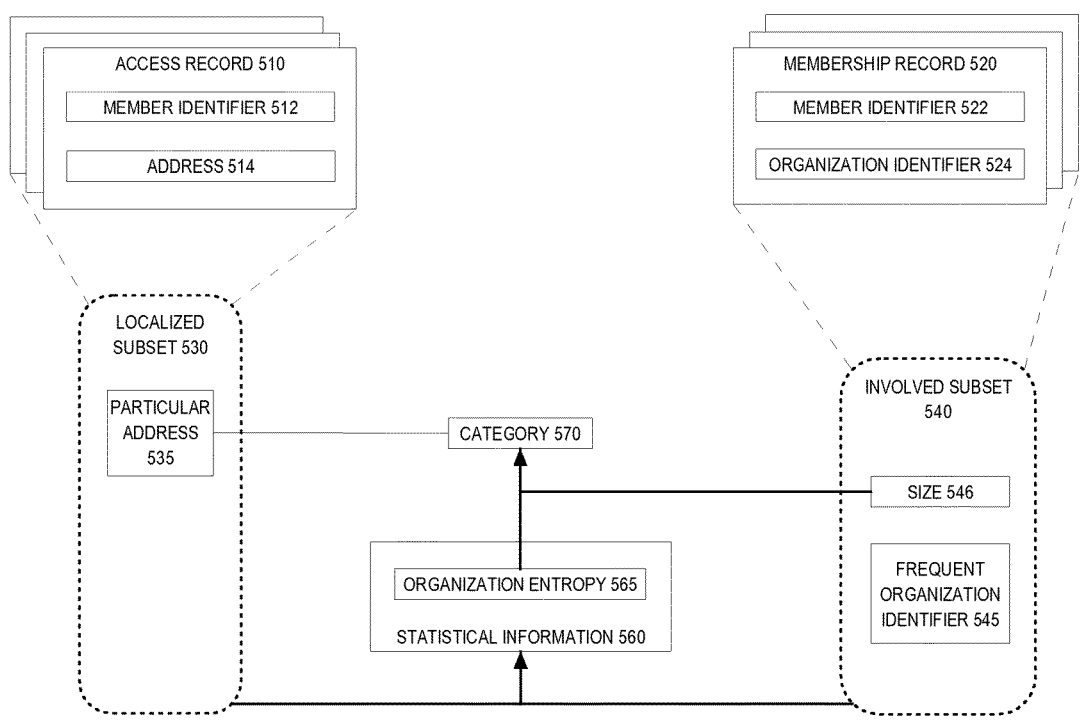
FIG. 5 is a block diagram that depicts an example computer system that automatically determines an organizational affiliation of a host address, in an embodiment.

FIG. 5 is a block diagram that depicts example computer 500 for automatically categorizing host addresses, in an embodiment. Computer system 500 may be an implementation of computer system 100. Computer system 500 categorizes a host address based on organizational entropy and other statistical information.

Computer system 500 has access records 510 and membership records 520, which may respectively be implementations of access records 110 and membership records 120. Computer system 500 processes records 510 and 520 to select localized subset 530 and involved subset 540, which may respectively be implementations of localized subset 130 and involved subset 140.

Computer system 500 may further process subsets 530 and 540 to categorize particular address 535 as commercial, public, or private. The categorization of particular address 535 is shown as category 570. An embodiment may have three instances of category 570, one for each of commercial, public, and private. Categorization of particular address 535 may be accomplished by associating particular address 535 with a particular instance of category 570.

Particular address 535 is commercial if it is used by many members, most of whom are affiliated with a same organization. For example, particular address 535 may be commercial if it is part of a corporate LAN that authenticates its users. A particular address 535 that can be categorized as commercial has membership and access patterns that statistically favor a determination that the address is owned by or significantly related to a particular organization.

If particular address 535 is used by many members of diverse organizational affiliations, then the address is public. For example, particular address 535 may be public if it is part of a LAN of a library or internet café that allows anonymous use. Anonymous use regards open access to the LAN, and does not mean that a website associated with computer system 500 is used anonymously. Indeed, recordation of member identifier 512 of access record 510 requires that the website be able to identify at least some users as particular members.

Because many unrelated users may freely use the open LAN of the library or internet café, the organizational affiliation of the users is orthogonal to the LAN itself, which yields organizational diversity. A particular address 535 that can be categorized as public has too much organizational diversity to determine that the address is owned by or significantly related to a particular organization.

A particular address 535 that is not used by many members is categorized as private. For example, particular address 535 may be private if it is associated with a residence, a small business, or a large business that discourages personal use of the world wide web. A particular address 535 that can be categorized as private has insufficient members to determine that the address is owned by or significantly related to a particular organization.

To categorize particular address 535 as commercial, public, or private, computer system 500 determines size 546 of involved subset 540 and organization entropy 565. Size 546 is the amount of membership records 520 within involved subset 540. Computer system 500 may categorize particular address 535 as private when size 546 does not exceed a threshold.

Computer system 500 does not determine frequent organization identifier 545 for a particular address 535 that is categorized as private. As such, computer system 500 does not associate an organization with a particular address 535 that is categorized as private.

Within statistical information 560 is organization entropy 565 that measures the entropy of organization identifiers 524 of membership records 520 within involved subset 540. Computer system 500 may categorize particular address 535 as public when organization entropy 565 exceeds a threshold.

Computer system 500 does not determine frequent organization identifier 545 for a particular address 535 that is categorized as public. As such, computer system 500 does not associate an organization with a particular address 535 that is categorized as public.

When size 546 is sufficient and organization entropy 565 is low, computer system 500 categorizes particular address 535 as commercial. For a particular address 535 that is categorized as commercial, computer system 500 determines frequent organization identifier 545.

Frequent organization identifier 545 indicates which organization that computer system 500 may associate with particular address 535. Computer system 500 may use other information within statistical information 560 to determine whether particular address 535 should be associated with frequent organization identifier 545 or remain unassociated.

The categorization of particular address 535, as determined by the association between the address and a category 570, is actionable. Computer system 500 may internally record the categorization and may share it with interested parties.

The categorization may subsequently be used for further analytics of a particular member or for a manual or automatic investigation of fraudulent or otherwise abusive activity. For example, subsequent quantitative analytics such as assessing the reputation of an address or a member may use this categorization as a formula term or other factor. Computer system 500 may use a determined categorization as a factor when selecting particular thresholds used within subsequent analytics.

Training, Evaluation, and Calibration

The quantitative analytics of computer systems 100, 300, and 500 may be designed to determine an organizational association of a host address from a wide assortment of attributes that occur along multiple dimensions. Furthermore, the analytics may be designed for bulk processing of addresses, such as IP addresses, in the absence of dedicated human oversight. A computer system may be more or less prone to faulty associations of an organization to an IP address. As such, an initial training and evaluation phase may be needed to ensure that the quantitative analytics are well calibrated.

During training, the computer system may process a limited training dataset of well-understood access records and membership records. This training dataset may include historical accesses from some addresses whose organizational association is already established with certainty and accesses from other addresses that were found to be abusive, perhaps through manual forensic investigation by a data scientist. Alternatively, the training dataset may consist of artificial access records that are contrived to exemplify interesting behavior patterns, or a mix of natural and artificial access records.

The training dataset may be evaluated by a data scientist to manually determine, or otherwise identify based on a priori knowledge or configuration, an expected organization for each IP address in the training dataset. The fitness of the computer system may be evaluated based on how well its generated organizational associations match the expected associations.

Thresholds such as 150, 317, 323, 347, and 350 may need adjustment during training to avoid false positives or false negatives. The percentages and other numeric components, upon which statistical information such as 160, 360, and 560 are based, may have adjustable weights that enable tuning Prior to integration into the statistical information, a numeric component may be formulaically adjusted or adjusted by a lookup table that imposes a step function or other nonlinearity to attenuate or exaggerate a value range.

The computer system may be properly calibrated by sufficient iterative tuning. The goal of training is to achieve convergence such that the generated organizational associations eventually match the expected associations to within an acceptable tolerance. After proper training, the computer system may be deployed into production.

During production operation, organizational associations may tend to be stable for each IP address, such that the associations change little over time. Excessive volatility of an organizational association of a given IP address may be grounds for classifying the address as suspicious. Excessive volatility across many IP addresses may instead indicate that operating assumptions have changed, in which case the computer system may need recalibration, such as retraining.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
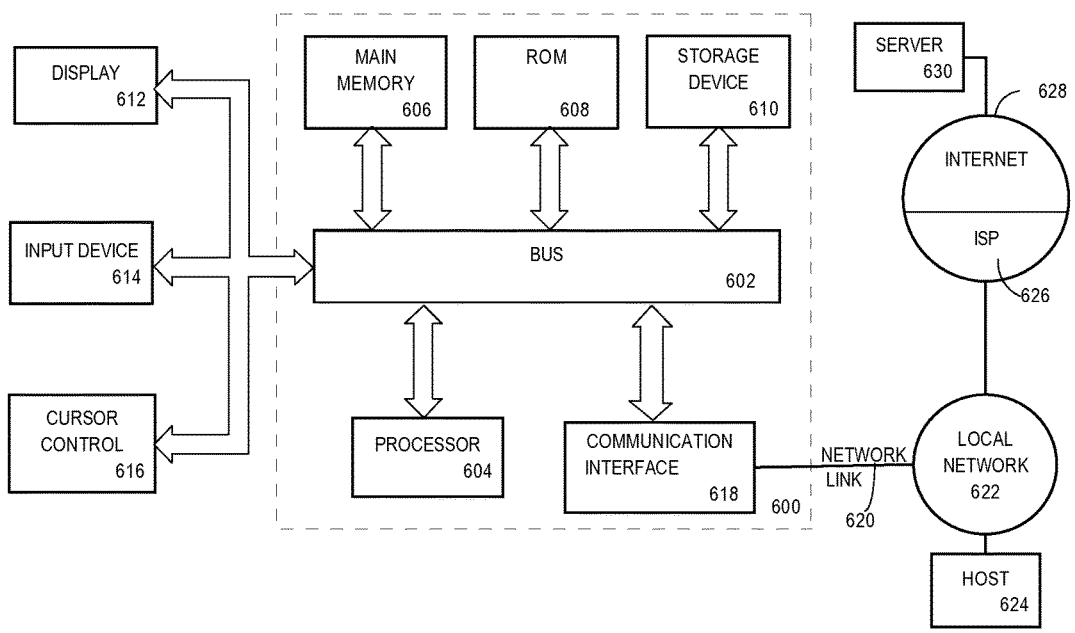
FIG. 6 is a block diagram that illustrates an example computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   storing a plurality of membership records and a plurality of access records, wherein each membership record of the plurality of membership records comprises an organization identifier that identifies an organization and a member identifier that identifies a member, wherein each access record of the plurality of access records comprises a member identifier that identifies a member and an internet protocol (IP) address that identifies a host computer;
   identifying a localized subset of access records of the plurality of access records, wherein each access record in the localized subset has a particular IP address or IP address subnet;
   identifying an involved subset of membership records of the plurality of membership records, wherein each membership record in the involved subset has a member identifier that matches a member identifier of an access record of the localized sub set;
   determining statistical information based on the localized subset of access records and the involved subset of membership records; and one or more computers identifying, based on the statistical information, a particular organization identifier that occurs in the membership records of the involved subset with a frequency that exceeds a threshold;

associating, by the one or more computers, the particular organization identifier with the particular IP address or IP address subnet;

indicating that a membership record, of the plurality of membership records, that is not in the involved subset of membership records incorrectly has the particular organization identifier.

2. The method of claim 1 further comprising categorizing the particular IP address as one of: commercial, private, or public.

3. The method of claim 2 wherein categorizing the particular address comprises categorizing the particular address based on the statistical information.

4. The method of claim 3 wherein categorizing the particular address comprises categorizing the particular address based on an entropy of the organization identifiers of the membership records of the involved subset.

5. The method of claim 3 wherein categorizing the particular address comprises categorizing the particular address based on a size of the involved subset of membership records.

6. The method of claim 1 wherein the statistical information comprises an entropy of the organization identifiers of the membership records of the involved sub set.

7. The method of claim 1 wherein the statistical information comprises a percentage, of the membership records of the involved subset, having an organization identifier that matches the organization identifier.

8. The method of claim 1 further comprising determining, based on the statistical information, a confidence level that the organization identifier of a particular membership record of the plurality of membership records is accurate.

9. The method of claim 1 wherein each access record of the plurality of access records further comprises a timestamp, and all access records of the localized subset have a timestamp that is more recent than a particular time.

10. The method of claim 1 wherein the statistical information is determined only if a size of the involved subset of membership records exceeds a threshold.

11. The method of claim 1 wherein the statistical information is determined only if a size of an affiliated subset of membership records of the plurality of membership records exceeds a threshold, and all membership records of the affiliated subset have an organization identifier that matches the particular organization identifier.

12. The method of claim 1 wherein the IP address of each access record of the plurality of access records comprises an IP version 6 (IPv6) address, wherein the IPv6 address of each access record of the plurality of access records comprises a subnet, and wherein all access records of the localized subset that have the particular address consist of all access records of the localized subset that have a particular subnet.

13. The method of claim 1 wherein each access record of the plurality of access records represents a webpage view.

14. The method of claim 1 wherein the particular address belongs to a particular organization, wherein the method further comprises iteratively adjusting at least one threshold until the organization identifier matches an identifier of the particular organization.

15. A system comprising:
a storage system configured to store a plurality of membership records and a plurality of access records, wherein each membership record of the plurality of membership records comprises an organization identifier that identifies an organization and a member identifier that identifies a member, wherein each access record of the plurality of access records comprises a member identifier that identifies a member and an internet protocol (IP) address that identifies a host computer; and a processor connected to the storage system and configured to:

identify a localized subset of access records of the plurality of access records, wherein each access record in the localized subset has a particular IP address or IP address subnet;

identify an involved subset of membership records of the plurality of membership records, wherein each membership record in the involved subset has a member identifier that matches a member identifier of an access record of the localized sub set;

determine statistical information based on the localized subset of access records and the involved subset of membership records; and identify, based on the statistical information, a particular organization identifier that occurs in the membership records of the involved subset with a frequency that exceeds a threshold;

associate the particular organization identifier with the particular IP address or IP address subnet;

indicate that a membership record, of the plurality of membership records, that is not in the involved subset of membership records incorrectly has the particular organization identifier.

16. One or more non-transitory computer readable media comprising instructions that when executed by one or more processors cause:

storing a plurality of membership records and a plurality of access records, wherein each membership record of the plurality of membership records comprises an organization identifier that identifies an organization and a member identifier that identifies a member, wherein each access record of the plurality of access records comprises a member identifier that identifies a member and an internet protocol (IP) address that identifies a host computer;

identifying a localized subset of access records of the plurality of access records, wherein each access record in the localized subset has a particular IP address or IP address subnet;

identifying an involved subset of membership records of the plurality of membership records, wherein each membership record in the involved subset has a member identifier that matches a member identifier of an access record of the localized sub set;

determining statistical information based on the localized subset of access records and the involved subset of membership records;

identifying, based on the statistical information, a particular organization identifier that occurs in the membership records of the involved subset with a frequency that exceeds a threshold;

associating the particular organization identifier with the particular IP address or IP address subnet;

indicating that a membership record, of the plurality of membership records, that is not in the involved subset of membership records incorrectly has the particular organization identifier.

17. The one or more non-transitory computer readable media of claim 16 wherein the instructions further cause categorizing, based on the statistical information, the particular address as one of: commercial, private, or public.

18. The one or more non-transitory computer readable media of claim 16 wherein the statistical information comprises an entropy of the organization identifiers of the membership records of the involved subset.

19. The one or more non-transitory computer readable media of claim 16 wherein the statistical information comprises a percentage, of the membership records of the involved subset, having an organization identifier that matches the organization identifier.

* * * * *